(12) United States Patent
Chen et al.

(10) Patent No.: US 10,255,692 B2
(45) Date of Patent: Apr. 9, 2019

(54) METHOD FOR TRACKING AN OBJECT IN AN IMAGE SEQUENCE

(71) Applicants: City University of Hong Kong, Kowloon (HK); Hong Kong Baptist University, Kowloon (HK)

(72) Inventors: Logn Chen, New Territories (HK); Zhongying Zhao, New Territories (HK); Hong Yan, Glebe (AU)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 0 days.

(21) Appl. No.: 15/478,354

(22) Filed: Apr. 4, 2017

(65) Prior Publication Data

US 2017/0294028 A1 Oct. 12, 2017

Related U.S. Application Data

(60) Provisional application No. 62/321,371, filed on Apr. 12, 2016.

(51) Int. Cl.
| | |
|---|---|
| *G06K 9/00* | (2006.01) |
| *G06T 7/73* | (2017.01) |
| *G06T 7/174* | (2017.01) |
| *G06T 7/00* | (2017.01) |

(52) U.S. Cl.
CPC .............. *G06T 7/73* (2017.01); *G06T 7/0012* (2013.01); *G06T 7/174* (2017.01); *G06T 2207/10016* (2013.01)

(58) Field of Classification Search
CPC ...... G06F 3/011; G06F 3/0346; G06F 3/0304; G06K 9/00221; G06K 9/00335; G06K 9/00369; G08C 17/00; G08C 17/02; H04N 5/2226; A63F 13/213; A63F 13/24; A63F 13/426; A63F 13/428; A63F 13/655; A63F 13/00; G06T 7/73
See application file for complete search history.

(56) References Cited

U.S. PATENT DOCUMENTS

2014/0378170 A1* 12/2014 Rudow ................. H04W 4/029
455/456.6

* cited by examiner

*Primary Examiner* — Duy M Dang
(74) *Attorney, Agent, or Firm* — Renner Kenner Greive Bobak Taylor & Weber

(57) ABSTRACT

A method for tracking a biological cell in an image sequence with at least a first image and a second image includes the steps of: identifying a plurality of biological cells in the first image and a plurality of biological cells in the second image; determining matching probability of a biological cell in the second image with a biological cell in the first image, based on relative positional relationships between the plurality of biological cells in the first image and relative positional relationships between the plurality of biological cells in the second image; and determining, based on the determined matching probability, a matching result relating to whether the biological cell in the second image matches with the biological cell in the first image. A match indicates that the biological cell in the second image corresponds with or originates from the corresponding biological cell in the first image.

23 Claims, 11 Drawing Sheets
(1 of 11 Drawing Sheet(s) Filed in Color)

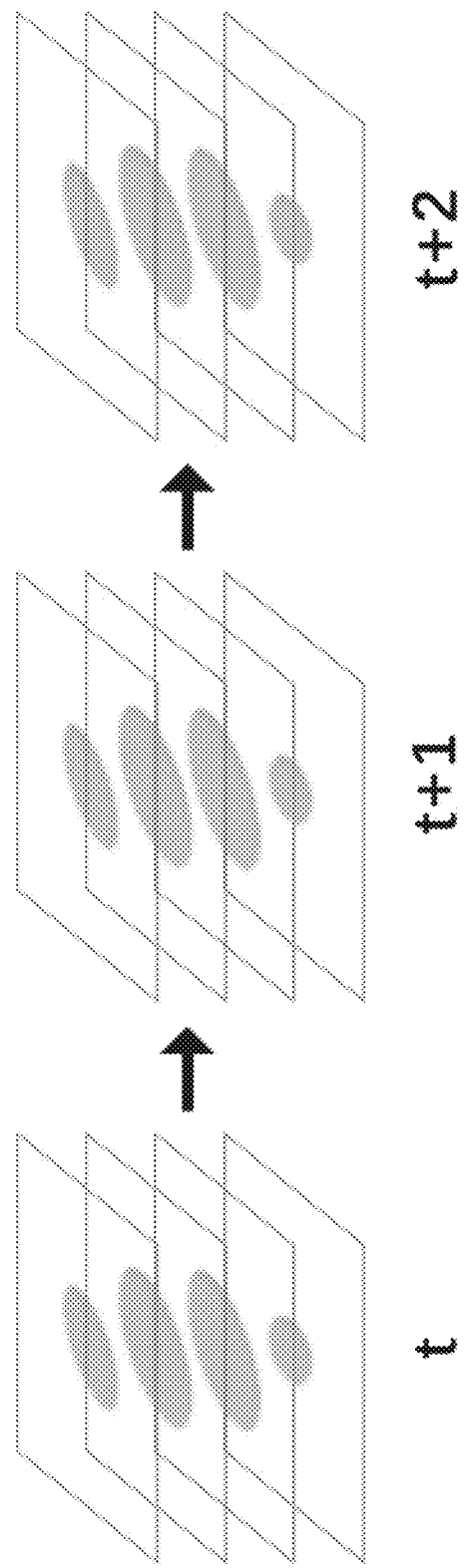

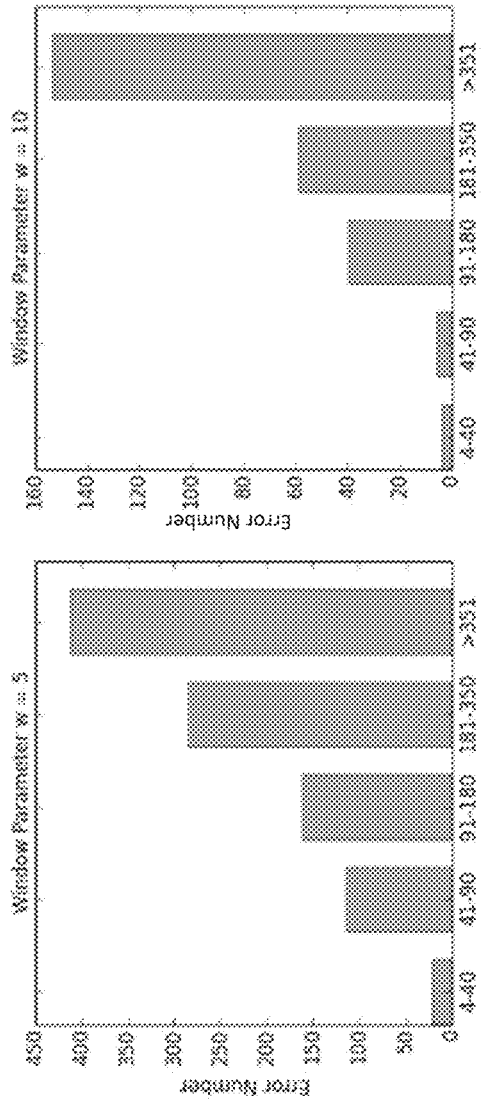
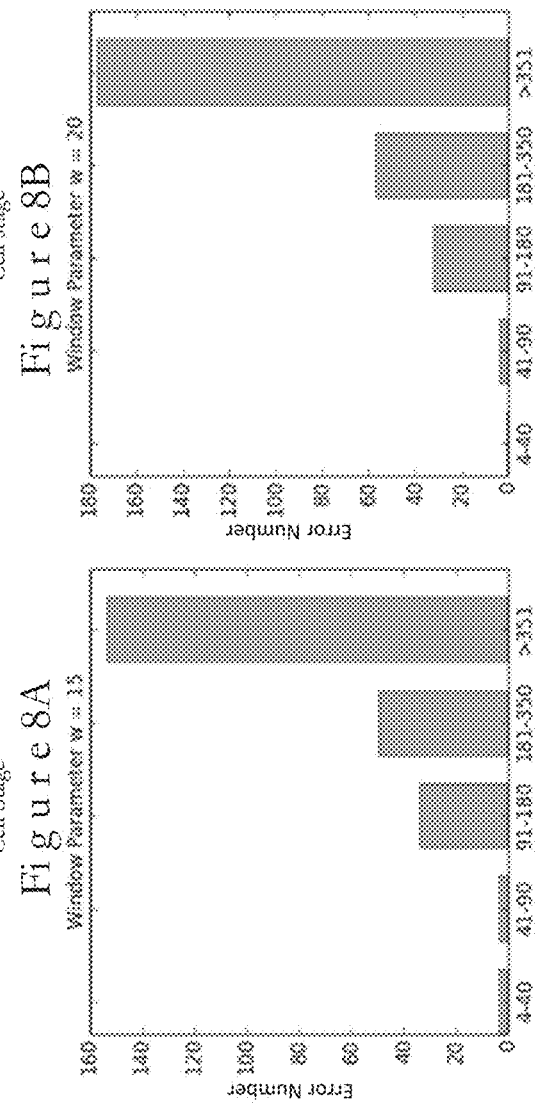
Figure 8A
Figure 8B
Figure 8C
Figure 8D

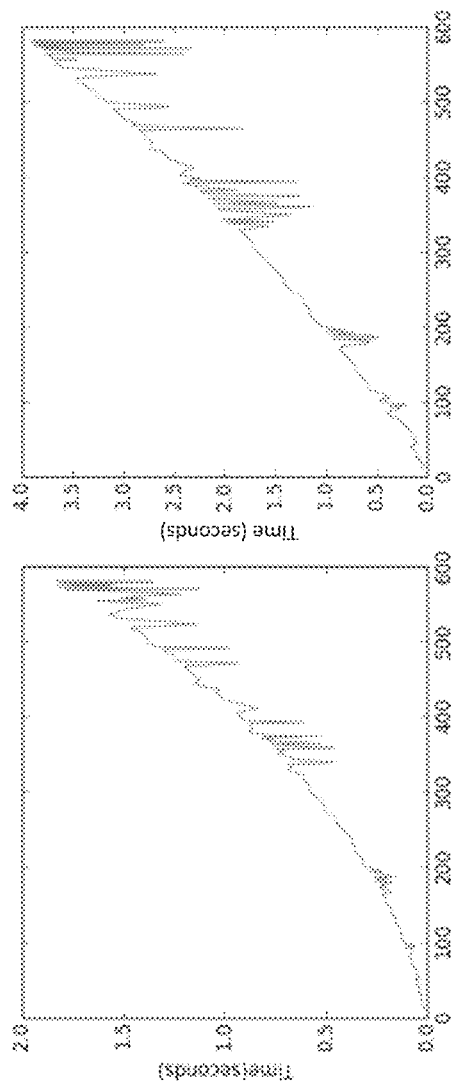
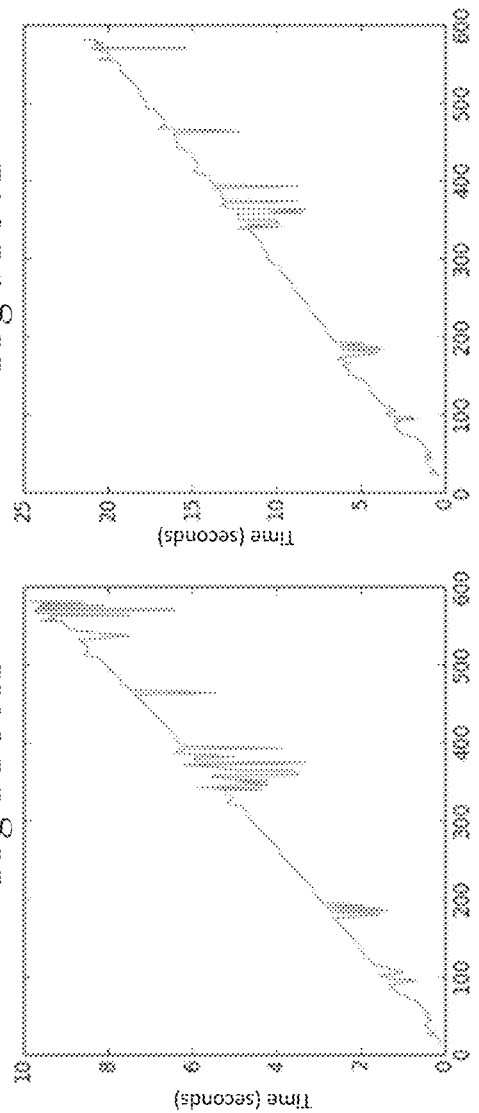
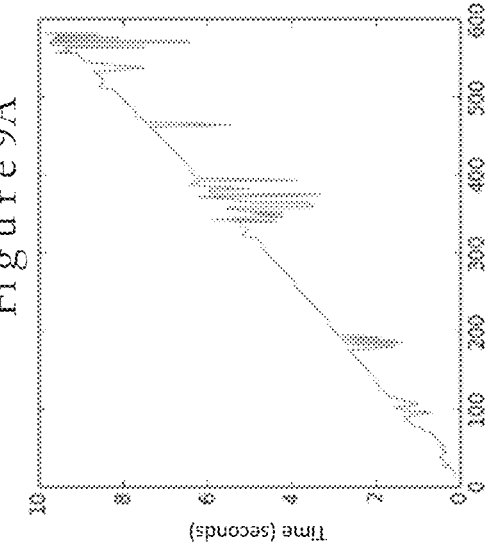
Figure 9A
Figure 9B
Figure 9C
Figure 9D

METHOD FOR TRACKING AN OBJECT IN AN IMAGE SEQUENCE

TECHNICAL FIELD

The present invention relates to a method for tracking one or more biological cells in an image sequence and particularly, although not exclusively, to a method for tracking and matching one or more biological cells in an image sequence based on probabilistic relaxation labeling (PRL) technique.

BACKGROUND

Three dimensional (3D) time-lapse images (hereafter termed as 4D images) can be used for tracking objects. For example, an object being imaged in an image sequence may move to from a first position in the first image to a second position in the second image. By correctly identifying the target object from the first and second images, and then comparing the first position with the second position, the movement and activity of the target object can be traced. This type of object tracking methods is useful in many applications, and in particular, in biological fields for performing cell tracking.

In one example, 3D time-lapse images of *C. elegans* embryos can provide highly valuable information for functional interpretation of its genome with high spatiotemporal resolution. Advanced imaging technology allows acquisition of 4D images of *C. elegans* embryogenesis with ease, from which a complete cell lineage tree (cell division and ancestry) can be built. Availability of the lineage tree makes it possible to dissect gene functions with single cell resolution at one-minute interval. However, achieving such spatiotemporal resolution requires the production of a huge amount of imaging data for a single embryo, and in such case it is technically very challenging to build the lineage tree by tracing the individual cells using manual methods.

Therefore, there exists a need for an algorithm that can perform cell tracking, or in general, object tracking, reliably and efficiently.

SUMMARY OF THE INVENTION

In accordance with a first aspect of the present invention, there is provided a method for tracking an object in an image sequence with at least a first image and a second image, the method comprising the steps of: identifying a plurality of objects in the first image and a plurality of objects in the second image; determining matching probability of an object in the second image with an object in the first image, based on relative positional relationships between the plurality of objects in the first image and relative positional relationships between the plurality of objects in the second image; and determining, based on the determined matching probability, a matching result relating to whether the object in the second image matches with the object in the first image, wherein a match indicates that the object in the second image corresponds with or originates from the corresponding object in the first image. The method also includes displaying the matching result. Preferably, the plurality of objects in the first image are all the objects in the first image, and the plurality of objects in the second image are all the objects in the second image. However, in some embodiments, the plurality of objects in the first image are only some of the objects in the first image, and the plurality of objects in the second image are only some of the objects in the second image. The images may be 2D images or 3D images. In this aspect, the objects are biological cells. The images in the image sequence are taken during development of the biological cells in which biological cells are moveable and dividable.

In one embodiment of the first aspect, the identification step comprises the step of determining positions of a plurality of objects in the first image and a plurality of objects in the second image by segmentation.

In one embodiment of the first aspect, the relative positional relationships between the plurality of objects in the first image comprises relative positional relationship between each of the respective objects in the first image with each of the other respective objects in the first image; and the relative positional relationships between the plurality of objects in the second image comprises relative positional relationship between each of the respective objects in the second image with each of the other respective objects in the second image.

In one embodiment of the first aspect, the method further comprises the step of: repeating the matching probability determination step and the matching determination step for each of the plurality of objects in the first image and each of the plurality of objects in the second image.

In one embodiment of the first aspect, the identification step comprises the step of: defining a plurality of objects in the first image at a first time point t as a set $Q_t = \{q_1, \ldots, q_i, \ldots, q_x, \ldots, q_n\}$ and a plurality of objects in the second image at a second time point t+1 as a set $S_{t+1} = \{s_j, \ldots, s_j, \ldots, s_y, \ldots, s_m\}$, where $n \geq 2$ and $m \geq 2$.

In one embodiment of the first aspect, the matching probability determination step comprises the step of calculating a compatibility coefficient $\gamma$ to determine compatibility of an object $q_i$ in the first image matching an object $s_j$ in the second image and an object $q_x$ in the first image matching an object $s_y$ in the second image, wherein the larger the compatibility coefficient, the higher the probability that object $q_i$ matches object $s_j$ and object $q_x$ matches object $s_y$.

In one embodiment of the first aspect, the step of calculating the compatibility coefficient $\gamma$ comprises the steps of: calculating a distance compatibility coefficient $\alpha$ between an object pair in the first image and an object pair in the second image; calculating an angle compatibility coefficient $\beta$ between a vector defined by the object pair in the first image and a vector defined by the object pair in the second image; and calculating the compatibility coefficient $\gamma$ by multiplying the distance compatibility coefficient $\alpha$ with the angle compatibility coefficient $\beta$.

In one embodiment of the first aspect, the distance compatibility coefficient $\alpha$ is calculated based on $$\alpha_{ijxy}^{t,t+1} = 1 - \left| \frac{d_t(q_i, q_x) - d_{t+1}(s_j, s_y)}{d_t(q_i, q_x) + d_{t+1}(s_j, s_y)} \right|,$$

where $d_t(q_i, q_x)$ is a distance between object pair $q_i$ and $q_x$ in the first image, $d_{t+1}(s_j, s_y)$ is a distance between object pair $s_j$ and $s_y$ in the second image.

In one embodiment of the first aspect, the angle compatibility coefficient $\beta$ is calculated based on $$\beta_{ijxy}^{t,t+1} = \left(1 + \frac{\overrightarrow{q_i q_x} \cdot \overrightarrow{s_j s_y}}{\|\overrightarrow{q_i q_x}\| \cdot \|\overrightarrow{s_j s_y}\|}\right) / 2$$

where $\overline{q_iq_x} \cdot \overline{s_js_y}$ is a dot product of a vector defined by object pair $q_i$ and $q_x$ in the first image and a vector defined by object pair $s_j$ and $s_y$ in the second image.

In one embodiment of the first aspect, the method further comprises the step of repeating the compatibility coefficient $\gamma$ calculation for each the plurality of objects in the first image and each the plurality of objects in the second image.

In one embodiment of the first aspect, the matching probability determination step further comprises the steps of: determining an initial matching probability of object $s_j$ in the second image matching object $q_i$ in the first image based on the determined compatibility coefficients $\gamma$; repeating the initial matching probability determination step of each of the objects in the second image and each of the objects in the first image so as to form a matching matrix between the first image and the second image using the initial matching probability determined for the plurality of objects in the second image and the plurality of objects in the first image; iteratively updating the matching matrix based on one or more predetermined equations to determine the matching probability.

In one embodiment of the first aspect, the initial matching probability of object $s_j$ in the second image matching object $q_i$ in the first image is determined based on $$p_{j \to i} = \Sigma_{x=1}^{n} \Sigma_{y=1}^{m} p_{y \to x}^{0} \gamma_{ijxy}^{t,t+1}.$$

In one embodiment of the first aspect, the method further comprises the step of normalizing the initial matching probability based on $$p_{j \to i}^{1} = \frac{p_{j \to i}}{\sum_{x=1}^{n} p_{j \to x}}$$

prior to forming the matching matrix.

In one embodiment of the first aspect, the matching matrix between the first image at the first time point t and the second image at the second time point t+1 has the form of:

$$P_{(t+1) \to t}^{1} = \begin{bmatrix} p_{1 \to 1}^{1} & \cdots & p_{1 \to n}^{1} \\ \vdots & \ddots & \vdots \\ p_{m \to 1}^{1} & \cdots & p_{m \to n}^{1} \end{bmatrix}$$

where $p_{j \to i} \in [0,1]$.

In one embodiment of the first aspect, the matching matrix is iteratively updated based on the following equations:

$$\delta_{j \to i}^{k-1} = \sum_{x=1}^{n} \sum_{y=1}^{m} p_{y \to x}^{k-1} \gamma_{ijxy}^{t,t+1},$$

$$P_{j \to i}^{k} = \frac{p_{j \to i}^{k-1} \delta_{j \to i}^{k-1}}{\sum_{l=1}^{n} p_{j \to l}^{k-1} \delta_{j \to l}^{k-1}}.$$

where $p_{j \to i}^{k}$ is the probability of object $q_i$ in the first image matching object $s_j$ in the second image after the $k^{th}$ iteration.

In one embodiment of the first aspect, the matching matrix is iteratively updated based on the following equations:

$$\delta_{j \to i}^{k-1} = \sum_{x=1}^{w} \sum_{y=1}^{w} p_{y \to x}^{k-1} \gamma_{ijxy}^{t,t+1},$$

$$p_{j \to i}^{k} = \frac{p_{j \to i}^{k-1} \delta_{j \to i}^{k-1}}{\sum_{i=1}^{w} p_{j \to l}^{k-1} \delta_{j \to l}^{k-1}},$$

where $p_{j \to i}^{k}$ is the probability of object $q_i$ in the first image matching object $s_j$ in the second image after the $k^{th}$ iteration, and w is a window parameter that has a value less than a number of the plurality of objects in the first image and a number of the plurality of objects in the second image.

In one embodiment of the first aspect, the method further comprises the step of stopping the iteration when all the values in an updated matching matrix becomes close to 0 or close to 1, where a value close to 0 indicates that object $s_j$ in the second image and object $q_i$ in the first image are not matched and a value close to 1 indicates that object $s_j$ in the second image and object $q_i$ in the first image are matched.

In one embodiment of the first aspect, the method further comprises the step of generating a diagram showing a correspondence between objects in the second image with objects the first image based on the matching result. Preferably, the diagram is a tree diagram.

In one embodiment of the first aspect, the images in the image sequence are microscopic images. In some embodiments, the images may be other types of images.

In one embodiment of the first aspect, the cells may be *C. elegans* cells.

In accordance with a second aspect of the present invention, there is provided a system for tracking an object in an image sequence with at least a first image and a second image, comprising: one or more processors arranged to identify a plurality of objects in the first image and a plurality of objects in the second image; determine matching probability of an object in the second image with an object in the first image, based on relative positional relationships between the plurality of objects in the first image and relative positional relationships between the plurality of objects in the second image; and determine, based on the determined matching probability, a matching result relating to whether the object in the second image matches with the object in the first image, wherein a match indicates that the object in the second image corresponds with or originates from the corresponding object in the first image. Preferably, the one or more processors are arranged to automatically determine the matching probability and the matching result. The system further comprises a display arranged to display the matching result. In this aspect, the objects are biological cells. The images in the image sequence are taken during development of the biological cells in which biological cells are movable and dividable.

In one embodiment of the second aspect, the one or more processors are further arranged to repeat the matching probability determination step and the matching determination step for each of the plurality of objects in the first image and each of the plurality of objects in the second image In one embodiment of the second aspect, the system further comprises an imaging device arranged to obtain the first image and the second image.

In accordance with a third aspect of the present invention, there is provided a non-transient computer readable medium for storing computer instructions that, when executed by one or more processors, causes the one or more processors to perform a system for tracking an object in an image sequence with at least a first image and a second image, the method comprising the steps of: identifying a plurality of objects in the first image and a plurality of objects in the second image; determining matching probability of an object in the second image with an object in the first image, based on relative positional relationships between the plurality of objects in the first image and relative positional relationships between the plurality of objects in the second image; and determining, based on the determined matching probability, a matching result relating to whether the object in the second image matches with the object in the first image, wherein a match indicates that the object in the second image corresponds with or originates from the corresponding object in the first image. In this aspect, the objects are biological cells. The images in the image sequence are taken during development of the biological cells in which biological cells are movable and dividable.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present invention will now be described, by way of example, with reference to the accompanying drawings in which:

FIG. 1A is a schematic diagram showing an image sequence with images taken at three consecutive time points t, t+1, t+2 in accordance with one embodiment of the present invention;

FIGS. 8A, 8B, 8C, and 8D are bar graphs showing the number of tracking errors produced using the tracking method of FIG. 4 with different window parameter values;

FIGS. 9A, 9B, 9C, and 9D are line plots showing computing time needed for performing one tracking between two adjacent time points using the tracking method of FIG. 4 with different window parameter values.

DETAILED DESCRIPTION OF THE PREFERRED EMBODIMENT

In the following description, the tracking method of the present invention will be described in relation to a particular cell tracking application, i.e., for tracking C. elegans cells in biological images. However, a person skilled in the art would appreciate that the tracking method in some embodiments of the present invention can be used for tracking other biological cells, or can be used for tracking other objects in other applications.

The inventors of the present invention have devised, through experiments and trials, that a number of different methods can be applied for tracking cells in different model organisms. One of the most popular method is the nearest neighbor (NN)/minimal movement matching algorithm, which matches the cell of a given time point to its spatially nearest one in the previous time point, using the cell moving distance between every adjacent frame to track cells. Generally, in these methods, the tracking error rate increases significantly when the cells become more crowded in the images.

The inventors of the present invention have devised, through experiments and trials, that the difficulty of cell tracking problem usually comes from two sources. One is the high cell density, and the other is the relatively low spatial and temporal image resolution. In an application for tracking C. elegans cells, one of the biggest challenges for effective cell tracing comes from the crowdedness of cells in an embryo at the end of C. elegans proliferative stage when the cell number is over 350. In practice, to maximize productivity and reduce experiment costs, images from 3 to 4 different embryos are usually collected simultaneously by an imaging device such as a microscope. However, phototoxicity often puts a constraint on temporal resolution in data acquisition, reducing the rate of which the images can be acquired. In one example, a temporal resolution of 60 to 90 seconds per time point is often not high enough for a reliable definition of all one-to-one or one-to-two (division) matching. This is because even between two adjacent time points, the same cell may migrate a long distance or divide, leading to ambiguity in cell tracing. To address these problems, the inventors of the present application have devised a more efficient and reliable object tracking method, as will be described in further detail below.

I. Problem Formulation

In the following examples of the present invention, every 3D time-lapse image dataset of C. elegans obtained covers the embryogenesis of a C. elegans embryo from 4-cell to 550-cell stages.

Figure 1B:
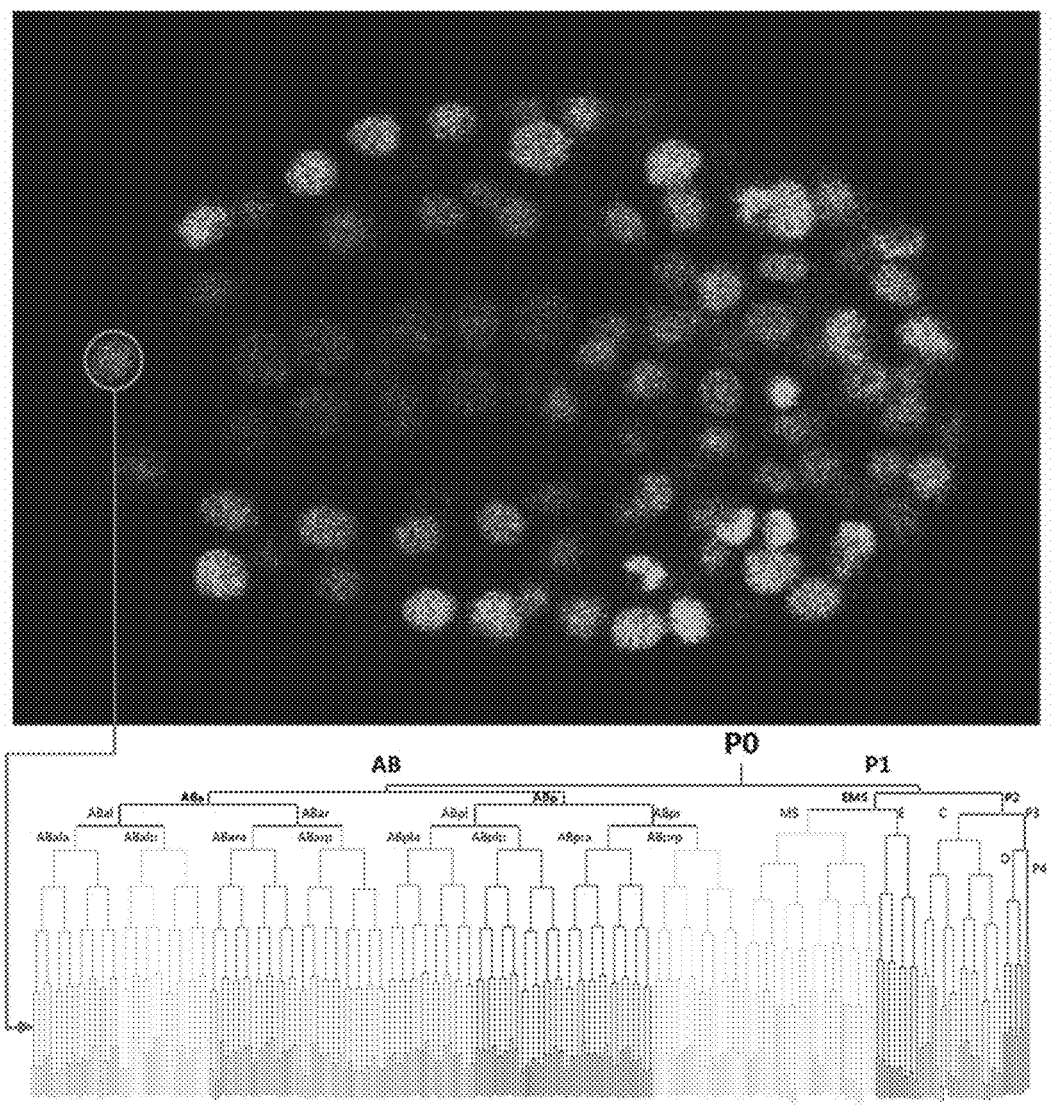
FIG. 1B shows a raw image taken in a single focal plane at time point t+2 of FIG. 1A, and a corresponding cell lineage tree diagram at the 200 cell stage.

FIG. 1A is a schematic diagram showing an image sequence with images taken at three consecutive time points t, t+1, t+2 in accordance with one embodiment of the present invention. FIG. 1B shows a raw image taken in a single focal plane at time point t+2 of FIG. 1A, and a corresponding cell lineage tree diagram at the 200-cell stage.

In one experiment performed relating to the illustrations of FIGS. 1A and 1B, every 3D time-lapse image dataset contains 200-240 time points, and each time point spans around 90 seconds. At every time point, there are 30-40 2D planes, corresponding to images taken at different depths along the imaging axis. In this example, all the images are collected from C. elegans strain BC10210 with Leica SP5 inverted confocal microscope at a constant ambient temperature of 20° C. The detail properties of the imaging dataset are listed in Table I.

TABLE I

PROPERTIES OF IMAGE DATASETS FROM OUR EXPERIMENTS

| | |
|---|---|
| Frame size (grid points) | 712 × 512 × 41 |
| Voxel size (μm) | 0.09 × 0.09 × 0.73 |
| Temporal resolution (min) | 1.5 |
| Number of time points | 200-240 |

During *C. elegans* embryogenesis, a cell may appear at both adjacent time points (i.e., appear in two or more images in the image sequence) or divide into two new cells during the time interval between taking of the first and the second images. As shown in FIG. 1B, most cells have very similar size, gray value and cell cycle with their neighbor cells. If the cells between every two adjacent time points (in two images) could be matched, then the cell-tracking problem would be solved.

In one embodiment of the present invention, the 4D images obtained at each time point are first subjected to a 3D segmentation process, after which the 3D position of each cell at every time point is obtained for the cell lineage tracking in the next stage. Then the cell-tracking procedure defines the relationship between cells at consecutive time points and finally produces a cell lineage tree with valuable information such as the cell cycle length, gene expression value and 3D positions etc., which are used for further biological analysis.

Figure 2:
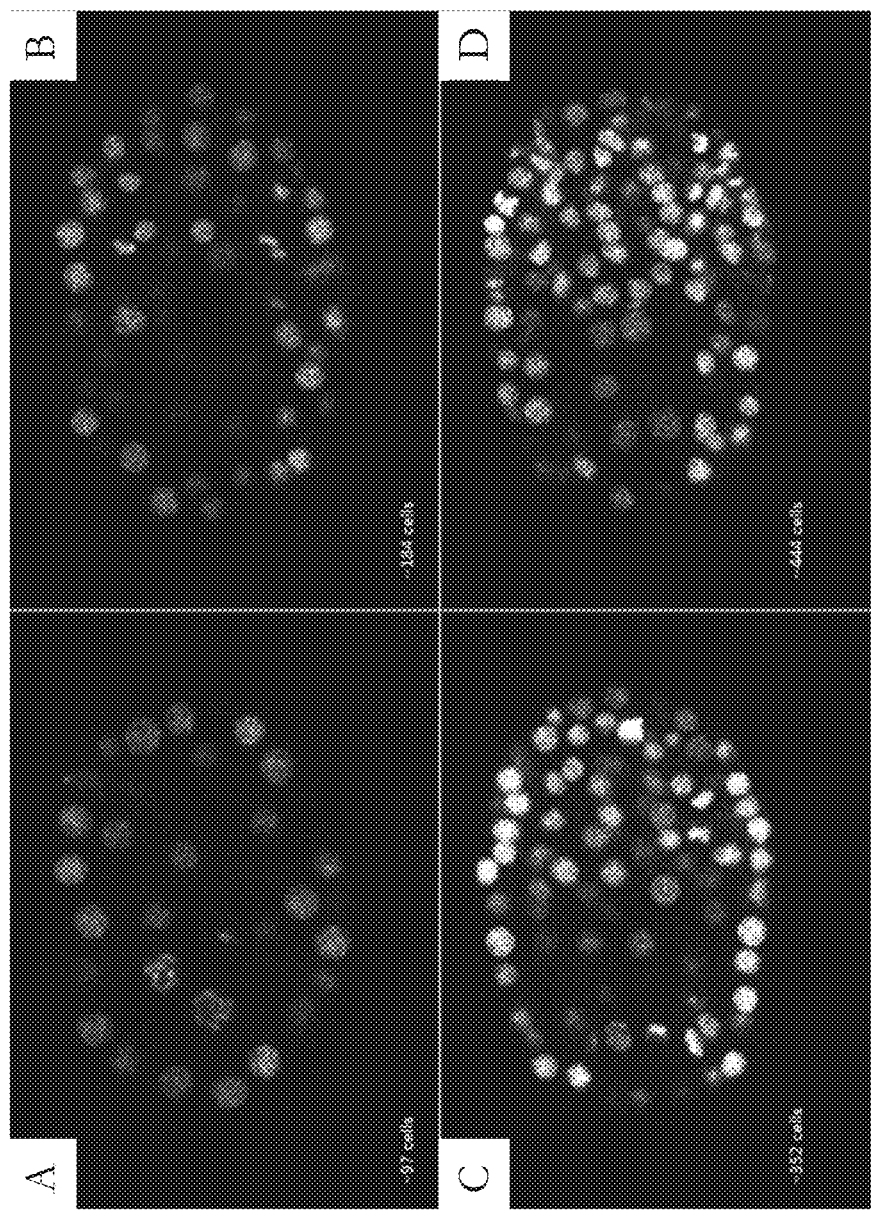
FIG. 2 shows four exemplary images that illustrate the densities of C. elegans cells at different developmental stages A-D (early stage to late stage)

During *C. elegans* late-stage embryogenesis, hundreds of cells are crowded with one another. FIG. 2 shows four exemplary images that illustrate the densities of *C. elegans* cells at different developmental stages A-D (early stage to late stage). It should be noted that only the nuclei of cells are labeled and visible in the *C. elegans* images in FIG. 2. In FIG. 2, stage A includes around 97 cells, stage B includes around 184 cells, stage C includes around 352 cells and stage D includes around 444 cells. As shown in FIG. 2, in the later stages of embryogenesis, many nuclei overlap with each other because of the high cell density. The cell density becomes very high after the 180-cell stage (stage B), and at around 440-cell stage (stage D), most cells are crowded against one another. The overlapped nuclei form a complicated and densely-compacted cell structure in late stages. In one example, when a cell moves a distance longer than its diameter, which frequently occurs if the temporal resolution is relatively low, a tracking error may arise by the NN matching method based on the cells' absolute position. In addition, two new-born daughters from a recent cell division move much faster than the non-dividing cells. Therefore, it is problematic to identify the cell divisions using NN matching methods.

In one embodiment of the present invention, for convenience, the cells detected at one time point t is defined as a set of points $Q_t = \{q_1, q_2, \ldots, q_n\}$, and the cells detected in the next time point t+1 is defined as another set of points $S_{t+1} = \{s_1, s_2, \ldots, s_m\}$. Because most cells will not die from the 4 to 550 cell stages during *C. elegans* embryogenesis (some cell deaths do take place, but their complete disappearance will not happen until very late stages), the number of cells at time t+1 should be equal to or larger than that at time t. If one cell is divided into two cells between the time points t and t+1, the two newly divided cells at time t+1 should be both matched to their mother cell at time t. Other non-divided cells should be matched one-to-one. Thus, the tracking problem becomes a non-rigid point-matching problem, and the technical task to be addressed is to find all the point-to-point matching pairs between the consecutive time points (images).

In order to solve this non-rigid point-matching problem, the present invention proposes a cell tracking method based on PRL. The matching probability between two points $q_i$ and $s_j$ will be initialized according to their relative position. Compared with using absolution position, the use of relative position is better for tracking because it could characterize the local structure of the embryo. In other words, the local structure based matching performs better than the NN matching. This is because a cell may move a long distance between two time-points, but its relative positional relationship between its neighboring cells will not change in the same magnitude as the absolute migration distance of a given dividing cell during a short time period. For example, two cells would almost never swap their positions with each other because all the cells are confined locally in the *C. elegans* embryo.

Figure 3:
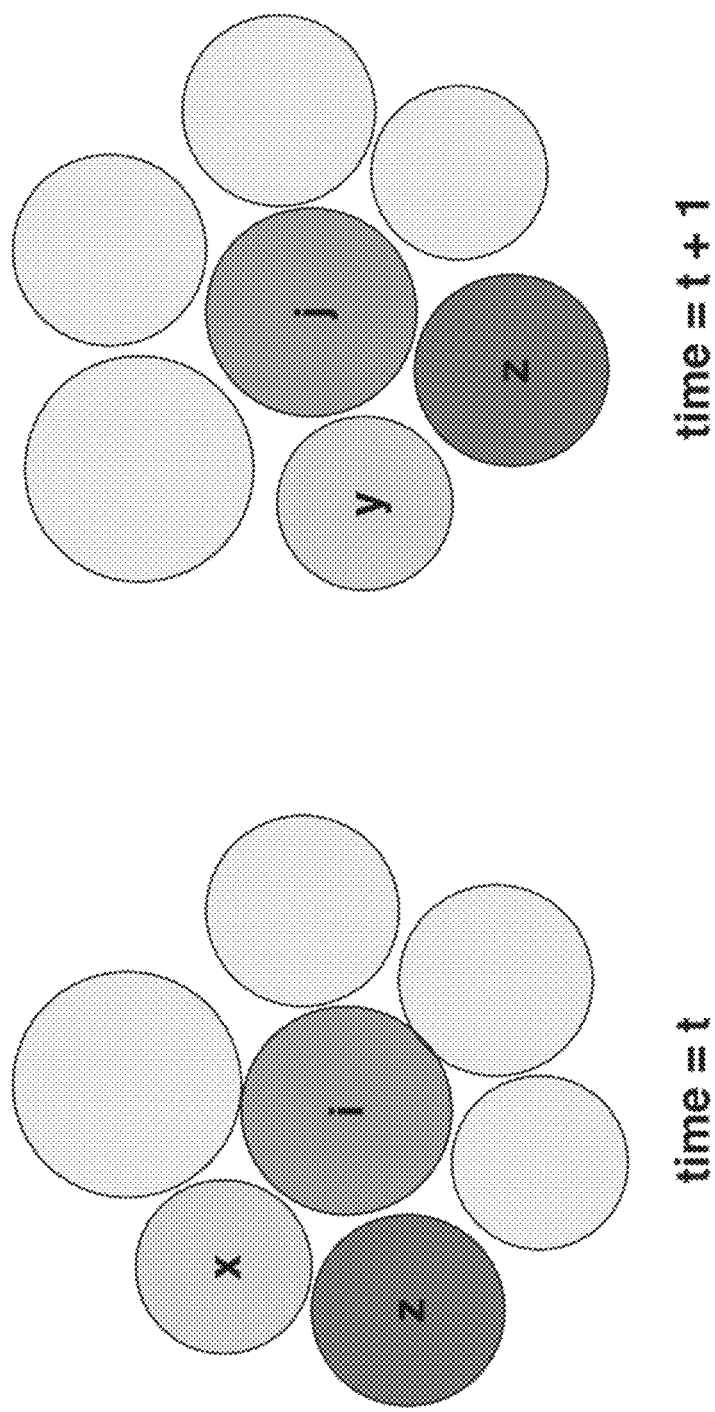
FIG. 3 is a schematic diagram that illustrates an example of matching cell pairs at two consecutive time points t, t+1.

FIG. 3 is a schematic diagram that illustrates the difficulty in matching cell pairs at two consecutive time points t, t+1. As illustrated in FIG. 3, when 4D images are acquired with low temporal resolution, cell $q_z$ at time t would be wrongly matched to cell $s_y$ at time t+1 based on the NN matching method. However, using the relative positions of the cells, cell $s_z$ at time t+1 will be matched to cell $q_z$ at time point t, and cell $s_y$ at time t+1 will be matched to cell $q_z$ at time t. Accordingly, the tracking method of the present invention, derived from the relative positional relationships between the cells, is expected to have a particularly good performance when tracking cells in datasets with a low temporal resolution.

II. Tracking Method

Figure 4:
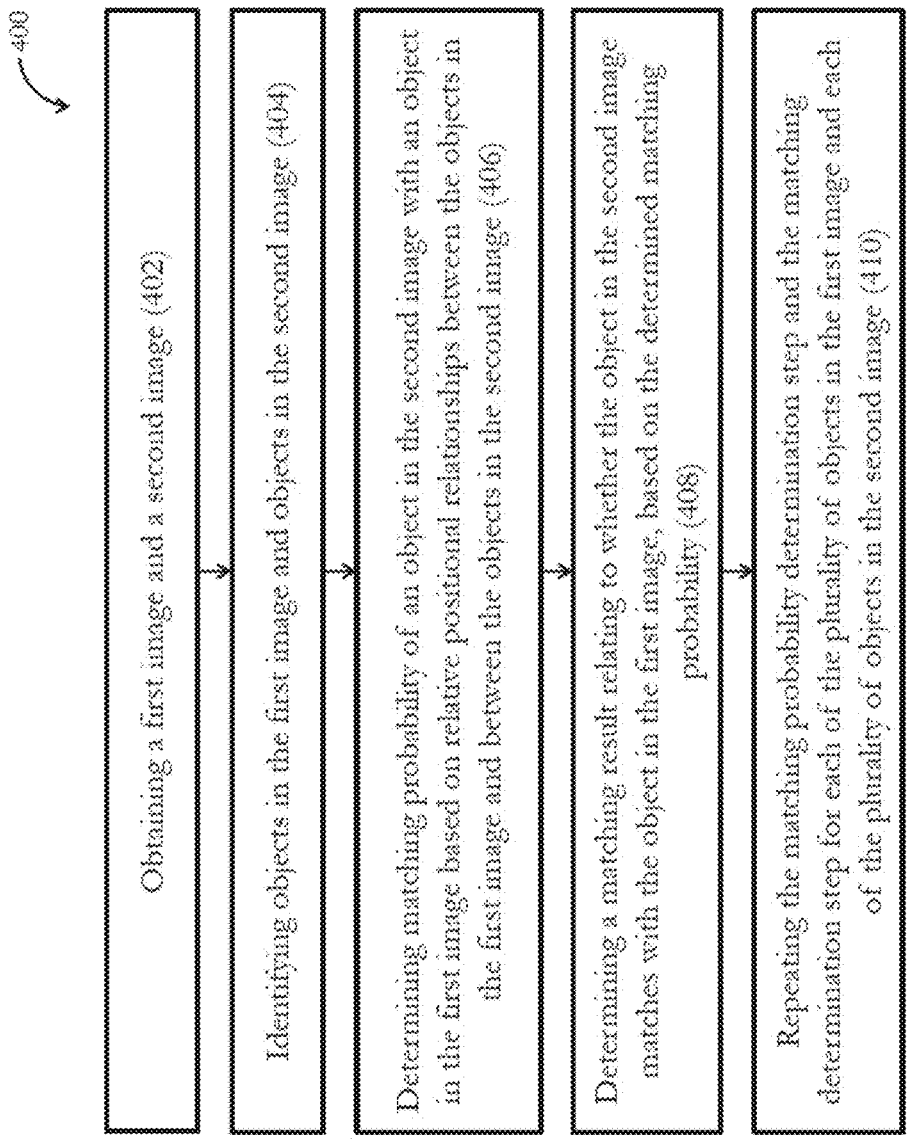
FIG. 4 is a flow diagram illustrating a method for tracking an object in an image sequence in accordance with one embodiment of the present invention.

FIG. 4 illustrates a tracking method in accordance with a preferred embodiment of the present invention. The method begins in step 402, in which a series of images (e.g. two or more images) of the cells may be obtained using an imaging device. For simplicity, only two images are obtained in this example. The images may be 2D or 3D images. After the first and second images of the cells are obtained, the method then proceeds to step 404, in which the objects in the first image and the objects in the second image are identified. This may be performed by segmenting the images obtained. In one example, all of the objects in the first image and all of the objects in the second image are identified. In another example, only some of the objects in the first image and some of the objects in the second image are identified. In step 406, the matching probability of an object in the second image with an object in the first image is determined based on relative positional relationships between the objects in the first image and between the objects in the second image. Preferably, the matching probability is determined by computing one or more compatibility coefficients, determining an initial matching probability, and applying relaxation labeling technique to the initial matching probability to determine a matching result. In step 408, the method involves determining a matching result relating to whether the object in the second image matches with the object in the first image, based on the determined matching probability. In step 410, the matching probability determination step and the matching determination step are repeated for each of the plurality of objects in the first image and each of the plurality of objects in the second image. In the present invention, a match would indicate that the object in the second image corresponds with or originates from the corresponding object in the first image. Optionally, the method may further includes generating a diagram, e.g., a tree diagram, showing a correspondence between objects in the second image with objects the first image based on the matching results.

In one embodiment of the present invention, the cells detected in an image at one time point t is defined as a set of points $Q_t=\{q_1, q_2, q_n\}$, and the cells detected in an image in the next time point t+1 is defined as another set of points $S_{t+1}=\{s_1, s_2, \ldots s_m\}$. The cell set $Q_t$ at time t is referred to as the label set and the cell set $S_{t+1}$ at time t+1 is the object set. In the present embodiment, the probability that the cell $q_i$ matches with cell $s_j$ is calculated based on the relative positional relationships with their neighboring cells. Also, all the probabilities will be updated with an iterative process until all their values are close to 0 or 1. If the probability is close to 1 (e.g., >0.95), then cell $s_j$ and $q_i$ are considered to be matched. If the probability is close to 0 (e.g., <0.05), then cell $s_j$ and $q_i$ are considered to be not matched.

The following further describes three main steps for determining matching probability in the method of FIG. 4. These three steps include computing the compatibility coefficients, matching probability initialization and relaxation labeling.

IIa. Computing the Compatibility Coefficients

In order to use the relative position information for the initialization of the matching process, two compatibility coefficients are defined in a preferred embodiment of the present invention.

Firstly, all the Euclidean distances between every point pair at every time point is calculated. Referring to FIG. 3, for cells $q_i$ and $q_x$ at time t and cells $s_j$ and $s_y$ at time t+1, the distance compatibility coefficient is determined based on $$\alpha_{ijxy}^{t,t+1} = 1 - \left|\frac{d_t(q_i, q_x) - d_{t+1}(s_j, s_y)}{d_t(q_i, q_x) + d_{t+1}(s_j, s_y)}\right|, \quad (1)$$

where $d_t(q_i,q_x)$ is the distance between cells $q_i$ and $q_x$, $d_{t+1}(s_j,s_y)$ is the distance between cells $s_j$ and $s_y$. If $(q_i,)$ equals to $d_{t+1}(s_j,s_y)$, then $\alpha_{ijxy}^{t,t+1}$. On the other hand, if $d_t(q_i,q_x) \gg d_{t+1}(s_j,s_y)$ or $d_t(q_i,q_x) \gg d_{t+1}(s_j,s_y)$, $\alpha_{ijxy}^{t,t+1}$ will be close to 0.

Secondly, the angle compatibility coefficient between vectors $\overrightarrow{q_iq_x}$ and $\overrightarrow{s_js_y}$ are determined based on $$\beta_{ijxy}^{t,t+1} = \left(1 + \frac{\overrightarrow{q_iq_x} \cdot \overrightarrow{s_js_y}}{\|\overrightarrow{q_iq_x}\| \cdot \|\overrightarrow{s_js_y}\|}\right)/2, \quad (2)$$

where $\overrightarrow{q_iq_x} \cdot \overrightarrow{s_js_y}$ is the dot product of vectors $\overrightarrow{q_iq_x}$ and $\overrightarrow{s_js_y}$, and $\|\overrightarrow{q_iq_x}\|$ and $\|\overrightarrow{s_js_y}\|$ are the lengths of the two vectors, respectively.

Assuming the angle between the vectors $\overrightarrow{q_iq_x}$ and $\overrightarrow{s_js_y}$ is $\theta$, then Equation (2) can be rewritten as $$\beta_{ijxy}^{t,t+1} = (1+\cos\theta)/2, \quad (3)$$

where $\theta \in [0,\pi]$. When $\theta$ equals to 0, $\beta_{ijxy}^{t,t+1}$ will be equal to 1, and this means that the vectors $\overrightarrow{q_iq_x}$ and $\overrightarrow{s_js_y}$ have the same direction. When $\theta$ equals to $\pi$, $\beta_{ijxy}^{t,t+1}$ will be equal to 0, and this implies an incompatibility between these two vectors.

Finally, an overall compatibility coefficient is calculated based on $$\gamma_{ijxy}^{t,t+1} = \alpha_{ijxy}^{t,t+1} \cdot \beta_{ijxy}^{t,t+1}. \quad (4)$$

which represents the compatibility of cell $q_i$ matching cell $s_j$ and cell $q_x$ matching cell $s_y$. According to the definition of $\alpha_{ijxy}^{t,t+1}$ and $\beta_{ijxy}^{t,t+1}$, these two coefficients both range from 0 to 1. Therefore, the overall compatibility coefficient $\gamma_{ijxy}^{t,t+1}$ also ranges from 0 to 1. A high value of $\gamma_{ijxy}^{t,t+1}$, e.g., close to or equal to 1, means a high compatibility between cell $q_i$ matching cell $s_j$ and cell $q_x$ matching cell $s_y$. On the other hand, a low value of $\gamma_{ijxy}^{t,t+1}$, e.g., close to or equal to 0, means a low compatibility between the two matching pairs.

IIb. Matching Probability Initialization

Matching probability initialization is essential in the method of the present embodiment since the PRL based procedure will only converge to a local optimal matching solution based on the matching initialization results. According to the compatibility coefficient defined above, the probability of cell $s_j$ matching cell $q_i$ is given by $$p_{j \to i} = \Sigma_{x=1}^{n} \Sigma_{y=1}^{m} p_{y \to x}^{0} \gamma_{ijxy}^{t,t+1}.$$

In the present embodiment, $P_{j \to i}$ is supported by $p_{y \to x}^{0} \gamma_{ijxy}^{t,t+1}$, and this means that the probability of cell $s_j$ matching cell $q_i$ depends on whether the matching is compatible with cell $s_y$ matching cell $q_x$. In the present embodiment of the probability initialization step, it is assumed that the probability of matching between every point at time t+1 and every point at time t is the same, so all $p_{y \to x}^{0}$ values are equal to 1. In one example, Equation (5) is also called the supported function.

In the present embodiment, however, $P_{j \to i}$ is not a precise probability of matching between cell $s_j$ and $q_i$ as $\Sigma_{x=1}^{n} p^{j \to x} \neq 1$. The real initial matching probability $p_{j \to i}^{1}$ between cell $s_j$ and $q_i$ can be calculated by normalizing $p_{j \to i}$ values according to $$p_{j \to i}^{1} = \frac{p_{j \to i}}{\sum_{x=1}^{n} p_{j \to x}}, \quad (6)$$

Finally, the initial overall matching matrix between time t and time t+1 is determined as $$P_{(t+1) \to t}^{1} = \begin{bmatrix} p_{1 \to 1}^{1} & \cdots & p_{1 \to n}^{1} \\ \vdots & \ddots & \vdots \\ p_{m \to 1}^{1} & \cdots & p_{m \to n}^{1} \end{bmatrix}, \quad (7)$$

where $p_{j \to i}^{1} \in [0,1]$.

IIc. Relaxation Labeling

In the present embodiment, an initial matching matrix is defined after the above two steps, as illustrated above. However, the matching matrix $P_{(t+1) \to t}^{1}$ only represents a soft matching relationship, since the matching probability $p_{j \to i}^{1}$ in this matching matrix ranges from 0 to 1. In order to obtain a more certain matching relationship, the matching matrix $P_{(t+1) \to t}^{1}$ is updated iteratively according to the following equations $$\delta_{j \to i}^{k \to 1} = \sum_{x=1}^{n} \sum_{y=1}^{m} p_{y \to x}^{k-1} \gamma_{ijxy}^{t,t+1}, \quad (8)$$

$$p_{j \to i}^{k} = \frac{p_{j \to i}^{k-1} \delta_{j \to i}^{k-1}}{\sum_{l=1}^{n} p_{j \to l}^{k-1} \delta_{i \to l}^{k-1}}, \quad (9)$$

where $p_{j \to i}^1$ is the probability of cell $q_i$ matching cell $s_j$ after the $k^{th}$ iteration. Preferably, the iteration will stop if each element in the matching matrix $P_{(t+1) \to t}^1$ are close to or equal to either 0 or 1.

According to the Equations (8) and (9), in the present embodiment, the probability of each matching relationship between two cells is dependent on the probabilities of other matching cell pairs. If a matching relationship is supported by other matching cell pairs, the probability of this matching relationship will increase. Otherwise the probability will decrease. In the present embodiment, when the matching matrix only contains values close to 0 or 1, a final matching result will be obtained.

Due to cell division, in some embodiments, two consecutive time points may have different numbers of cells. Thus, in the final matching matrix, if two cells $s_j$ and $s_y$ at time t+1 both match to the same cell $q_i$ at time t, then it can be interpreted that cell $q_i$ is divided into two cells $s_j$ and $s_y$ during the time interval between the time t and the time t+1. Using this method in the present embodiment, not only the cell movements, but also cell divisions can be detected.

IId. Lineage Tree Generation

In one embodiment, when the matching process between every pair of adjacent time points is completed, a diagram in the form of a cell lineage tree may be generated to illustrate the matching result. An exemplary cell lineage tree is shown in FIG. 1B. As shown in FIG. 1B, the first 4 cells in the lineage tree are named ABa, ABp, E and MS based on their positions in the *C. elegans* embryos. Subsequently, the newly divided cells are named based on the division angle and their mother cell's name. In the example of FIG. 1B, assuming the mother cell is ABa, the two daughter cells will be named ABal and ABar according to their relative positions with their mother cell. Preferably, all cells in the lineage tree may be named according to this strategy. Cells with the same name in different wild type embryos will have the same cell fate, which means that these cells play the same roles in the *C. elegans* embryogenesis. Thus, *C. elegans* cell tracking using the tracking method in one embodiment of the present invention makes it possible to analyse the *C. elegans* embryogenesis at single cell resolution.

III. Experimental Results

Figures 5A, 5B:
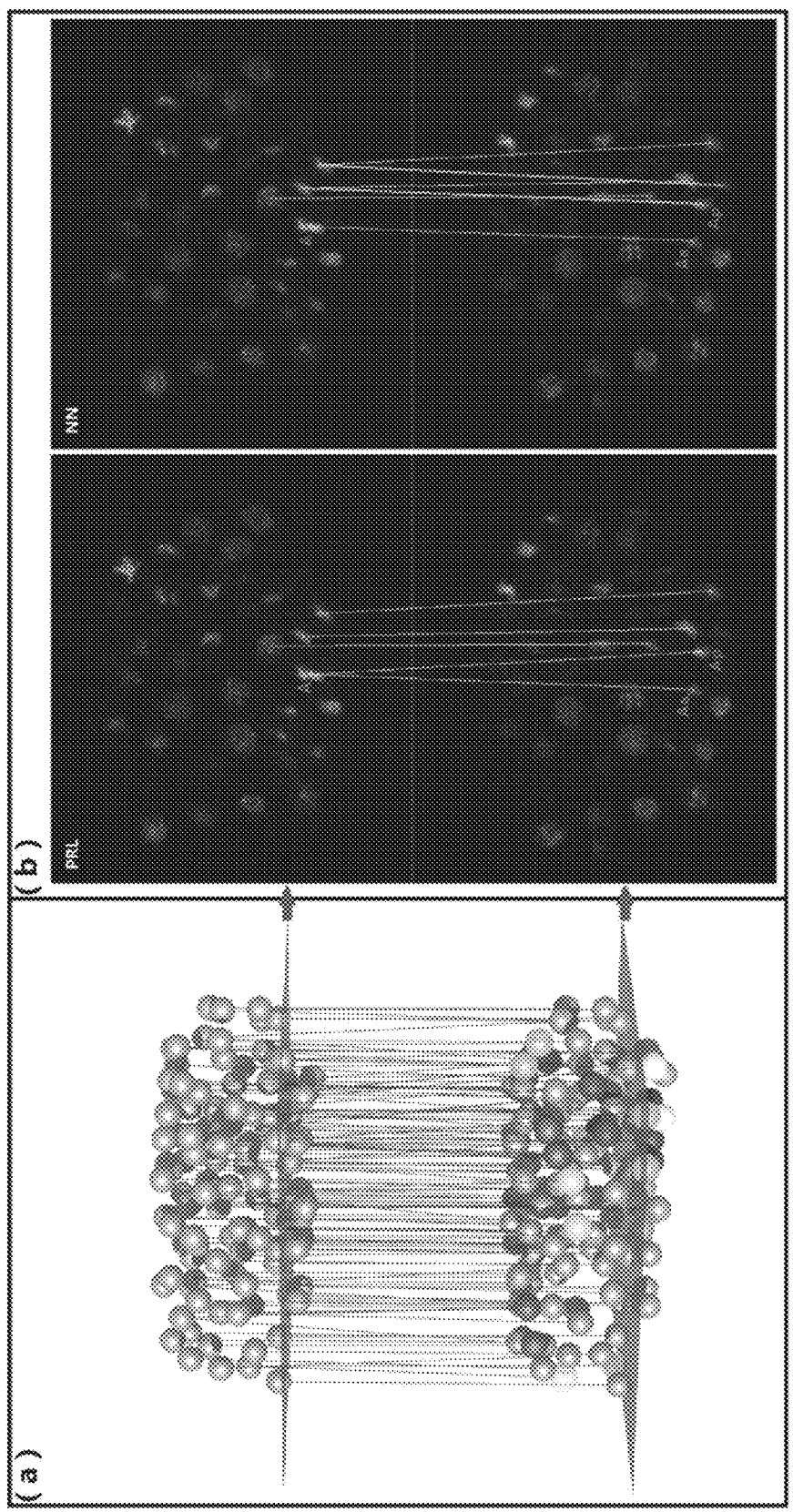
FIG. 5A shows a 3D representation of cell matching between two adjacent cell stages using the tracking method of FIG. 4.
FIG. 5B shows a matching result obtained using the tracking method of FIG. 4 and a matching result obtained using the nearest neighbor matching method.

FIG. 5A shows a 3D representation of cell matching between two adjacent cell stages using the tracking method of FIG. 4 (and described in Section II). In FIG. 5A, each pair of matched cells in two cell stages is represented with a straight line and new-born cells from cell division are shown in color while non-dividing cells shown in grey.

FIG. 5B shows a matching result (left) obtained using the tracking method of FIG. 4 and a matching result (right) obtained using the nearest neighbor matching method. As shown in FIG. 5B, in the result obtained using the tracking method of FIG. 4, cell A is divided into two cells Aa and Ap between the two cell stages and so there is a one-to-two match. The probabilistic relaxation labeling (PRL) based method of the present embodiment identifies the cell division and the matching correctly. On the other hand, in the result obtained using the nearest neighbor matching method, Cell A's division affects the positions of its neighbors, which lead to 2NN matching tracking errors (the red lines).

Figure 6:
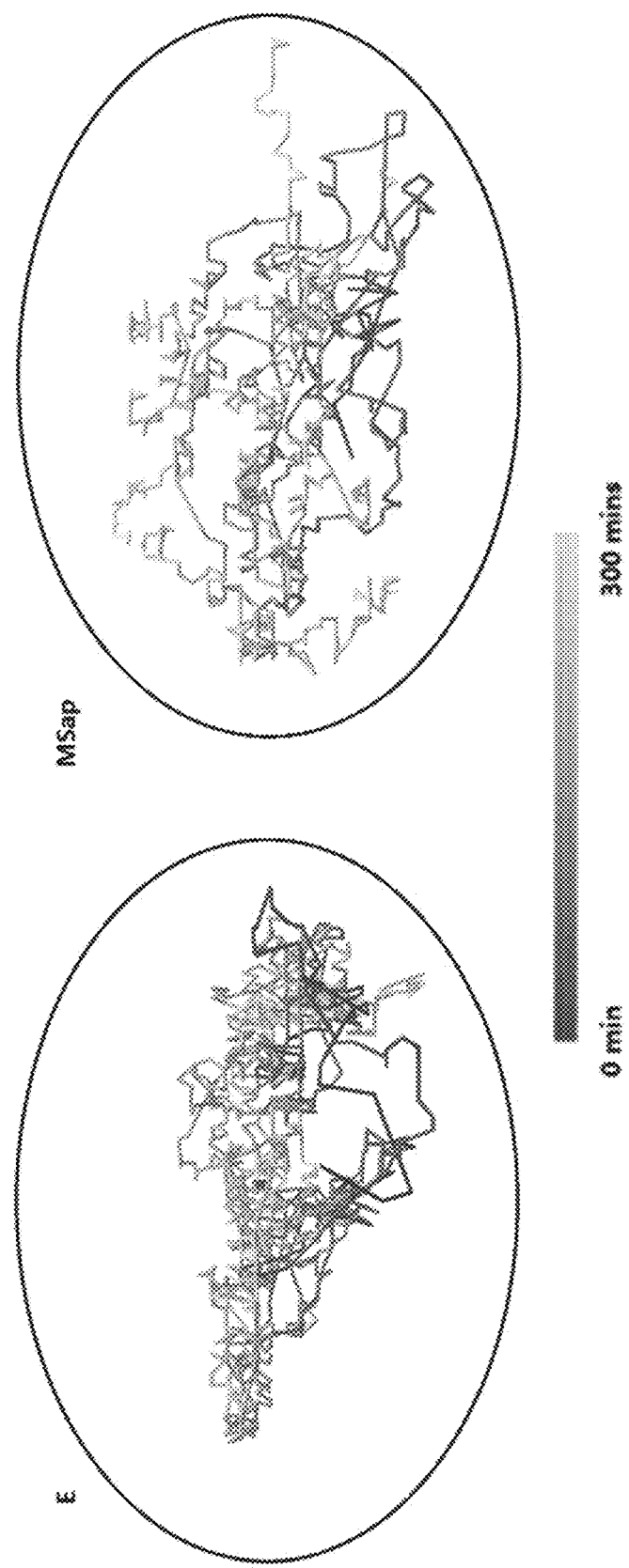
FIG. 6 shows 4D trajectories of two cells named E and MSap and one of their descendants up to 550 cell stages obtained based on the tracking method of FIG. 4.

FIG. 6 shows 4D trajectories of two cells named E and MSap and one of their descendants up to 550-cell stages obtained based on the tracking method of FIG. 4. In FIG. 6, the color of the trajectories changed along with the time. In this example, cell E's descendants will become intestinal cells and cell MSap's descendants will become muscle cells.

The performance of the embodiment of the method of FIG. 4 was further evaluated by performing experiments using 2 wild type embryo imaging datasets. In this example, each of the dataset contains 220 time points with a temporal resolution of 90 seconds. The method in the present invention could match every cell between two adjacent time points. Thus, every cell is linked to another two or three (in case of cell division) cells before and after the current time point. The number of links required for building one lineage tree is over 40,000 and a total of more than 80,000 cells are matched in this analysis for two embryo imaging datasets. In the present experiment, cell segmentation has been performed before cell tracking to determine all the cell positions at every time point. In order to minimize the effect of cell segmentation errors on cell-tracking process, all the cells segmentation results were further checked manually to ensure that all the cell position data are error free. Furthermore, both datasets are tracked manually and the obtained results are used as the ground truth to verify the automatic cell tracking result in the present experiments.

IIIa. Experiments with Original Temporal Resolution

An experiment testing the performance of the embodiment of the method of FIG. 4 and the performance of the NN matching algorithm with the above two wild type datasets at the original temporal resolution of 90 seconds was performed. The accuracy of each method was analyzed by comparing the automatic tracking result and the manually built lineage trees. The result of tracking errors at 5 different cell stages at a temporal resolution of 90 sections is illustrated in FIG. 7A.

Figure 7A:
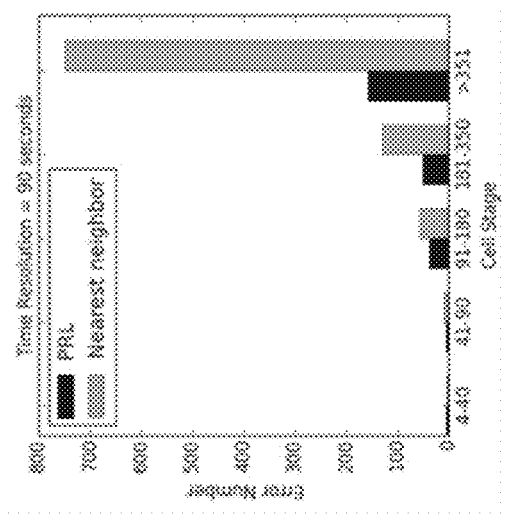
FIGS. 7A, 7B, 7C, and 7D are bar graphs comparing the number of tracking errors produced at different temporal resolution using the tracking method of FIG. 4 and using the nearest neighbor matching method.
Figure 7B:
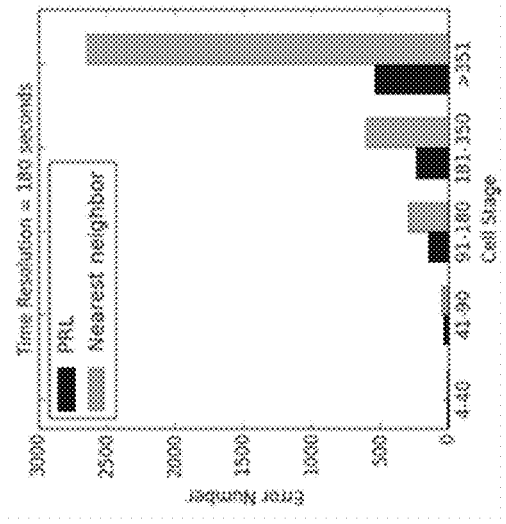
Figure 7C:
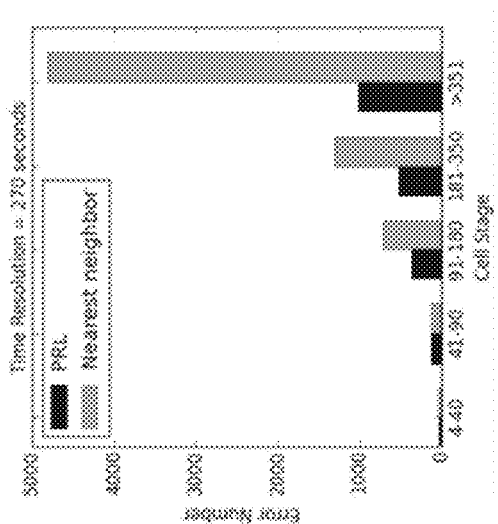
Figure 7D:
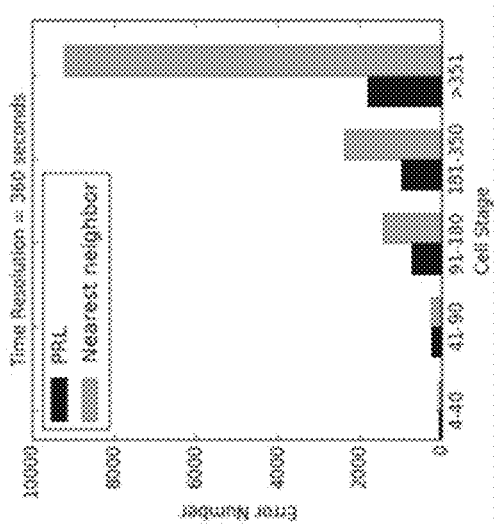

In FIG. 7A, at the 90 seconds temporal resolution, the NN algorithm and the method of the embodiment of FIG. 4 achieve a similar matching performance before the 90-cell stage. This is because that in the early stages of *C. elegans* embryogenesis, the distance between cells is much longer than the diameters of the cells. However, with the number of cells increasing (i.e., at later cell stages), the cells become more and more crowded. The experiment results show that the method of the embodiment of FIG. 4 performs much better than the NN matching algorithms starting from the 90-cell stage. The method of the embodiment of FIG. 4 can maintain a high accuracy rate even in very late stages. As demonstrated in FIG. 7A, at >350-cell stages, the method of the embodiment of FIG. 4 only produced 162 tracking errors while the NN matching algorithm generated 732 tracking errors. Finally, from the 4-cell stage to the 550-cell stage, the method of the embodiment of FIG. 4 only produced 232 tracking errors, while the NN matching algorithm produced 946 tracking errors.

In the present application, a high accuracy rate is of paramount importance since the tracking errors will take multiple human hours to manually edit the lineage. For example, a laboratory scientist needs 10 to 30 seconds to identify and correct one tracking error caused by the tracking algorithm, which means that the PRL based method of the embodiment of FIG. 4 could save (946-232)×15 s≈3 hours in editing before further biological studies in each biological experiment. For thousands of experiments that are typically needed in a project, the saving of manual work in error correction would be very significant.

IIIb. Experiments with Different Temporal Resolution

Due to the limitations of the experiment conditions, the time interval of the 4D images may be larger than 90 seconds. Also, sometimes the images at some time points are unavailable for image segmentation. Thus, it is necessary to verify the performance of the method of the embodiment of FIG. 4 at a temporal resolution of lower than 90 seconds, e.g., by removing some time points in a dataset. In one experiment, three further different temporal resolutions with time intervals as 180 seconds, 270 seconds and 360 seconds, are tested. The results of tracking errors at 5 different cell stages are counted at four different temporal resolutions (90 seconds, 180 seconds, 270 seconds and 360 seconds) are illustrated in FIGS. 7A-7D.

FIGS. 7A-7D indicate that the method of the embodiment of FIG. 4 also work for imaging datasets with an extremely low temporal resolution. At the temporal resolution of 180 seconds, the method of the embodiment of FIG. 4 only produced about 700 tracking errors (which is even better than the NN matching at the temporal resolution of 90 seconds) while the NN match method generated more than 3000 tracking errors. At 270 seconds and 360 seconds resolutions, the method of the embodiment of FIG. 4 also work well at <350-cell stage while the NN matching method produced more than 2000 tracking errors for the same cell stage. These results prove that if the time interval of obtaining the imaging datasets is doubled or if images at some time points are unavailable, the accuracy of the PRL-based tracking method of the embodiment of FIG. 4 could still be assured.

IIk. Experiments with Different Window Parameters

Another important performance indicator for a tracking method is the computational complexity, which is also verified in one experiment. Computational complexity is crucial because a large number of datasets need to be processed in cell tracking. It is desirable to have a low computational complexity for such large-scale analysis. Assuming that the cells numbers at time t and at the time t+1 are both N, the computational complexity will be $O(N^4)$ for the PRL based method of the embodiment of FIG. 4 according to Equations (8) and (9), and this may, in some embodiments, be too high for large-scale analysis.

In a preferred embodiment of the present invention, a window parameter w is added in the calculation of the matching probability in the method of FIG. 4 so as to reduce the computational complexity. In this embodiment, a window parameter w is added to Equations (8) and (9), and so these Equations become $$\delta_{j\to i}^{k-1} = \sum_{x=1}^{w}\sum_{y=1}^{w} p_{y\to x}^{k-1}\gamma_{ijxy}^{t,t+1}, \quad (10)$$

$$p_{j\to i}^{k} = \frac{p_{j\to i}^{k-1}\delta_{j\to i}^{k-1}}{\sum_{l=1}^{w} p_{j\to l}^{k-1}\delta_{j\to l}^{k-1}}, \quad (11)$$

The adding of a window parameter w in Equations (8) and (9) is based on an assumption (or fact) that a cell could only move a limited distance between adjacent time points. w cells in the previous time point can be chosen as the possible matching cells based on the cell-cell distance. Meanwhile, the local structure information is enough to yield satisfactory performance of the method proposed in the present invention. Thus, only one cell's relative position with the w nearest cells in the same time point can be used, instead of the cell's relative position with each and every cells at the same time point. In one embodiment, after adding the window parameter w, the computational complexity of the PRL method in the present invention becomes O(N).

The tracking method in one embodiment of the present invention is implemented in Python and/or C++. In other embodiment, other programming languages may be used.

An experiment using different window parameter values w was performed using the tracking method of the present embodiment. The number of tracking errors and the time (in seconds) required for one tracking with different window parameter w are presented in FIGS. 8A-9D. As show in FIGS. 8A-9D, when the window parameter w is 10 or 15, the overall performance of the PRL based method in the present embodiment is the best. When window parameter w is 20, the PRL based method in the present embodiment performs the best at <180-cell stages. Thus, in order to gain the best performance, different window parameters may be chosen for different cell stages in a preferred embodiment of the present invention.

In one experiment, on a 3.47 GHz PC with 10 GB of RAM, when different window parameter values were chosen, the computing time of the method of the present embodiment for one matching pair is 0.1 to 20 seconds with a single threaded process. As the window parameter w increases, the time required will be increased significantly. The time required is also affected by the number of cells at a time point. In one example, when the window parameter w is 10, the overall processing time is 285 seconds for one full lineage tracking from 4 to 550 cell stages, which is fast enough for a large-scale analysis.

IIId. Experiments with Multi-Cores CPUs

Since the matching processes between different time points can be treated independently, it is easy to realize the method of the present embodiment with multi-core CPUs (see Table II below) or GPUs. As shown in Table II, generally, as the number of cores used increases, the computing time decreases. When the window parameter w is 10 and number of CPU cores is 12, only about half a minute is needed for one full lineage tracking. In some embodiments, other parallel processors and electronic devices, such as the field programmable gate arrays (FPGAs), can also be used to speed up the computation in PRL. This again demonstrates that the tracking method in embodiments of the present invention is a promising tool for large-scale image analysis.

TABLE II

TIME (SECONDS) NEEDED FOR ONE FULL LINEAGE TRACKING USING MULTI-CORE CPUS WITH DIFFERENT WINDOW PARAMETER VALUES

|  | 1 core | 4 cores | 12 cores |
|---|---|---|---|
| w = 5 | 115.08 | 31.07 | 13.71 |
| w = 10 | 285.29 | 88.94 | 32.50 |
| w = 15 | 778.73 | 230.92 | 96.11 |
| w = 20 | 1757.38 | 509.16 | 221.89 |

IV. System for Implementing the Tracking Method

Figure 10:
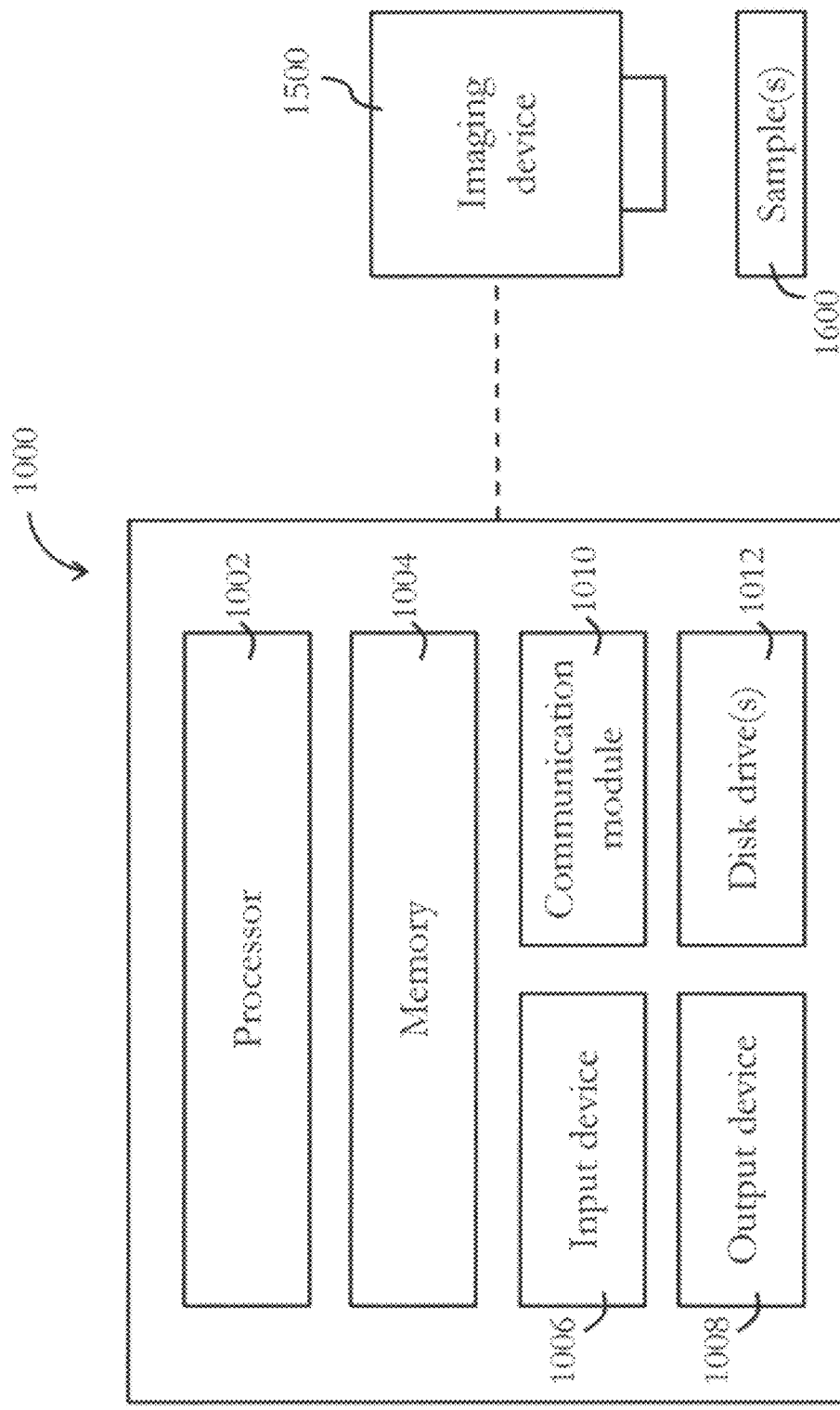
FIG. 10 is a block diagram showing a system for implementing the tracking method of FIG. 4 in accordance with one embodiment of the present invention.

Referring to FIG. 10, there is shown a schematic diagram of an exemplary information handling system 1000 that can be used to implement the tracking method 400 in accordance with one embodiment of the present invention. The information handling system 1000 may have different configurations, and it generally comprises suitable components necessary to receive, store and execute appropriate computer instructions or codes. The main components of the information handling system 1000 are a processing unit 1002 and a memory unit 1004. The processing unit 1002 comprises one or more processors such as a CPU, a GPU, an MCU, etc., which may be single-core or multi-cores. The memory unit 1004 may include a volatile memory unit (such as RAM), a non-volatile unit (such as ROM, EPROM, EEPROM and flash memory) or both. Preferably, the information handling system 1000 further includes one or more input devices 1006 such as a keyboard, a mouse, a stylus, a microphone, a tactile input device (e.g., touch sensitive screen) and a video input device (e.g., camera). The information handling system 1000 may further include one or more output devices 1008 such as one or more displays, speakers, disk drives, and printers. The displays may be a liquid crystal display, a light emitting display or any other suitable display that may or may not be touch sensitive. The information handling system 1000 may further include one or more disk drives 1012 which may encompass solid state drives, hard disk drives, optical drives and/or magnetic tape drives. A suitable operating system may be installed in the information handling system 1000, e.g., on the disk drive 1012 or in the memory unit. The memory unit 1004 and the disk drive 1012 may be operated by the processing unit 1002. The information handling system 1000 also preferably includes a communication module 210 for establishing one or more communication links (not shown) with one or more other computing devices such as a server, personal computers, terminals, wireless or handheld computing devices. The communication module 1010 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit 1002, the memory unit 1004, and optionally the input devices 1006, the output devices 1008, the communication module 1010 and the disk drives 1012 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network.

In one embodiment, the information handling system 1000 may be further connected with an imaging device 1500 arranged to obtain images of one or more sample 1600. The imaging device 1500 may be a camera, an optical or electronic microscope, an MRI machine, an ultrasound machine, etc., that is adapted to take images of one or more samples 1600 at different time-points. Preferably, the information handling system 1000 may be used to control operation of the imaging device 1500. In one example, the samples 1600 are biological cells, and the imaging device 1500 is arranged to capture images of the cells in vivo.

In one embodiment, after the images are obtained by the imaging device 1500, they are transferred to the information handling system 1000 to be processed by the one or more processors. In particular, the one or more processors may identify the objects in the images, determine matching probability of one or more objects in the first image with one or more objects in the second image, and determine a matching result. Optionally, the one or more processors 1002 may be operable to generate a diagram showing a correspondence between objects in the second image with objects the first image based on the matching results. The input devices 1006 of the information handling system 1000 may receive user commands for operating the tracking method. The output devices 1008 of the information handling system 1000 may be used for displaying the matching result, and optionally, the corresponding diagram. In one embodiment, the result, interim or final, may be stored in the memory unit 1004. Preferably, the one or more processors 1002 are arranged to perform the method 400 in an automatic or semi-automatic manner, with minimal user intervention.

A person skilled in the art would appreciate that the information handling system 1000 shown in FIG. 2 is merely exemplary, and that different information handling systems 1000 may have different configurations and still be applicable to perform the tracking method 400 of the present invention.

A person skilled in the art would appreciate that although the tracking method in some embodiments of the present invention as described above relates to tracking of *C. elegans* cells, the method in the present invention can be applied to other cell tracking systems for tracking other biological cells. Also, the tracking method of the present invention, in some other embodiments, can be applied for general object tracking using video camera or mobile phones. For example, the tracking method may be used to track movement of objects in images taken using video camera or mobile phones.

As shown in the above, the cell tracking method in one embodiment of the present invention has a high accuracy, especially using the 4D images acquired during late stage of *C. elegans* embryogenesis (e.g., ≥500 cells) with relatively low temporal resolution (e.g., ≥180 s). More particularly, in the present invention, the cell tracking method is based on probabilistic relaxation labeling (PRL) technique. The biggest difference between the cell tracking method in the present invention and the existing method is that the method in the present invention mainly makes use of the embryo local cell-cell geometrical structure information to match and link the cells across every image frames in the dataset, instead of just using the single cell's position, movement and other characteristics. In other words, the cell tracking method in the present invention will not regard a cell as a single point but a small structure that consists of the cell and the cell's neighbor cells.

The object tracking method and system in embodiments of the present invention have a lot of advantages. For example, the method in embodiments of the present invention exhibits satisfactory object tracking performance, even in situations where there is a relatively high object density and relatively low spatial and temporal image resolution. In a particular cell tracking application, the method in the present invention significantly out-performs the popular neighbor (NN)/minimal movement matching algorithm. The method in the embodiments of the present invention is effective and efficient in that it can be performed at high speed with minimal error, making it suitable for parallel computing. Also, as a result, the present invention is particularly adapted for large-scale image analysis. In one example, by realizing the method of the present invention on multi-core CPUs, an effective tool for analyzing large-scale data consisting of 3D time-lapse live cell images can be provided. In short, the object tracking method in the present invention is versatile, reliable and efficient in processing large-scale data, providing much higher tracking accuracy using less image frames. A person skilled in the art would appreciate other advantages of the embodiments of the present invention, by referring to the detailed description and the accompanying drawings of the present disclosure.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for tracking a biological cell in an image sequence, the image sequence including at least, a first image and a second image taken during development of biological cells in which biological cells are movable and dividable, the method comprising the steps of:
    identifying, using one or more processors, a plurality of biological cells in the first image and a plurality of biological cells in the second image;
    determining, using the one or more processors, a matching probability of a biological cell in the second image with a biological cell in the first image, based on relative positional relationships between the plurality of biological cells in the first image and relative positional relationships between the plurality of biological cells in the second image; and
    determining, using the one or more processors and based on the determined matching probability, a matching result indicating whether the biological cell in the second image matches with the biological cell in the first image, wherein a match indicates that the biological cell in the second image corresponds with or originates from the corresponding biological cell in the first image; and
    displaying, at an output device operable connected with the one or more processors, the matching result.

2. The method in accordance with claim 1, wherein the identification step comprises the step of:
    determining positions of a plurality of biological cells in the first image and a plurality of biological cells in the second image by segmentation.

3. The method in accordance with claim 1, wherein the relative positional relationships between the plurality of biological cells in the first image comprises relative positional relationship between each of the respective biological cells in the first image with each of the other respective biological cells in the first image; and the relative positional relationships between the plurality of biological cells in the second image comprises relative positional relationship between each of the respective biological cells in the second image with each of the other respective biological cells in the second image.

4. The method in accordance with claim 1, further comprising the step of: repeating the matching probability determination step and the matching determination step for each of the plurality of biological cells in the first image and each of the plurality of biological cells in the second image.

5. The method in accordance with claim 4, further comprising the step of: generating a diagram showing a correspondence between biological cells in the second image with biological cells the first image based on the matching result.

6. The method in accordance with claim 5, wherein the diagram is a tree diagram.

7. The method in accordance with claim 1, wherein the identification step comprises the step of:
    defining a plurality of biological cells in the first image at a first time point t as a set $Q_t=\{q_1, \ldots, q_i, \ldots, q_x, \ldots, q_n\}$ and a plurality of biological cells in the second image at a second time point t+1 as a set $S_{t+1}=\{s_1, \ldots, s_j, \ldots, s_y, \ldots, s_m\}$, where n≥2 and m≥2.

8. The method in accordance with claim 7, wherein the matching probability determination step comprises the steps of:
    calculating a compatibility coefficient γ to determine compatibility of a biological cell $q_i$ in the first image matching a biological cell $s_j$ in the second image and a biological cell $q_x$ in the first image matching a biological cell $s_y$ in the second image, wherein the larger the compatibility coefficient, the higher the probability that biological cell $q_i$ matches biological cell $s_j$ and biological cell $q_x$ matches biological cell $s_y$.

9. The method in accordance with claim 8, wherein the step of calculating the compatibility coefficient γ comprises the steps of:
    calculating a distance compatibility coefficient α between a biological cell pair in the first image and a biological cell pair in the second image;
    calculating an angle compatibility coefficient β between a vector defined by the biological cell pair in the first image and a vector defined by the biological cell pair in the second image; and
    calculating the compatibility coefficient γ by multiplying the distance compatibility coefficient α with the angle compatibility coefficient β.

10. The method in accordance with claim 9, wherein the distance compatibility coefficient α is calculated based on $$\alpha_{ijxy}^{t,t+1} = 1 - \left| \frac{d_t(q_i, q_x) - d_{t+1}(s_j, s_y)}{d_t(q_i, q_x) + d_{t+1}(s_j, s_y)} \right|,$$

where $d_t(q_i,q_x)$ is a distance between biological cell pair $q_i$ and $q_x$ in the first image, $d_{t+1}(s_j,s_y)$ is a distance between biological cell pair $s_j$ and $s_y$ in the second image.

11. The method in accordance with claim 10, wherein the angle compatibility coefficient β is calculated based on $$\beta_{ijxy}^{t,t+1} = \left(1 + \frac{\overrightarrow{q_iq_x} \cdot \overrightarrow{s_js_y}}{\|\overrightarrow{q_iq_x}\| \cdot \|\overrightarrow{s_js_y}\|}\right)/2,$$

where $\overrightarrow{q_iq_x} \cdot \overrightarrow{s_js_y}$ is a dot product of a vector defined by biological cell pair $q_i$ and $q_x$ in the first image and a vector defined by biological cell pair $s_j$ and $s_y$ in the second image.

12. The method in accordance with claim 8, further comprising the step of:
   repeating the compatibility coefficient γ calculation for each the plurality of biological cells in the first image and each the plurality of biological cells in the second image.

13. The method in accordance with claim 12, wherein the matching probability determination step further comprises the steps of:
   determining an initial matching probability of biological cell $s_j$ in the second image matching biological cell $q_i$ in the first image based on the determined compatibility coefficients γ;
   repeating the initial matching probability determination step of each of the biological cells in the second image and each of the biological cells in the first image so as to form a matching matrix between the first image and the second image using the initial matching probability determined for the plurality of biological cells in the second image and the plurality of biological cells in the first image; and
   iteratively updating the matching matrix based on one or more predetermined equations to determine the matching probability.

14. The method in accordance with claim 13, wherein the initial matching probability of biological cell $s_j$ in the second image matching biological cell $q_i$ in the first image is determined based on $$p_{j \to i} = \Sigma_{x=1}^{n} \Sigma_{y=1}^{m} p_{y \to x}^{0} \gamma_{ijxy}^{t,t+1}.$$

15. The method in accordance with claim 14, further comprising the step of normalizing the initial matching probability based on $$P_{j \to i}^{1} = \frac{p_{j \to i}}{\sum_{x=i}^{n} P_{j \to x}},$$

prior to forming the matching matrix.

16. The method in accordance with claim 15, wherein the matching matrix between the first image at the first time point t and the second image at the second time point t+1 has the form of:

$$P_{(t+1) \to t}^{1} = \begin{bmatrix} p_{1 \to 1}^{1} & \cdots & p_{1 \to n}^{1} \\ \vdots & \ddots & \vdots \\ p_{m \to 1}^{1} & \cdots & p_{m \to n}^{1} \end{bmatrix}$$

where $p_{j \to i}^{1} \in [0,1]$.

17. The method in accordance with claim 15, wherein the matching matrix is iteratively updated based on the following equations:

$$\delta_{j \to i}^{k-1} = \sum_{x=1}^{n} \sum_{y=1}^{m} p_{y \to x}^{k-1} \gamma_{ijxy}^{t,t+1},$$

$$P_{j \to i}^{k} = \frac{p_{j \to i}^{k-1} \delta_{j \to i}^{k-1}}{\sum_{l=1}^{n} p_{j \to l}^{k-1} \delta_{j \to l}^{k-1}},$$

where $p_{j \to i}^{k}$ is a probability of biological cell $q_i$ in the first image matching biological cell $s_j$ in the second image after the $k^{th}$ iteration.

18. The method in accordance with claim 15, wherein the matching matrix is iteratively updated based on the following equations:

$$\delta_{j \to i}^{k-1} = \sum_{x=1}^{w} \sum_{y=1}^{w} p_{y \to x}^{k-1} \gamma_{ijxy}^{t,t+1},$$

$$p_{j \to i}^{k} = \frac{p_{j \to i}^{k-1} \delta_{j \to i}^{k-1}}{\sum_{l=1}^{w} p_{j \to l}^{k-1} \delta_{j \to l}^{k-1}},$$

where $p_{j \to i}^{k}$ is a probability of biological cell $q_i$ in the first image matching biological cell $s_j$ in the second image after the $k^{th}$ iteration, and w is a window parameter that has a value less than a number of the plurality of biological cells in the first image and a number of the plurality of biological cells in the second image.

19. The method in accordance with claim 13, further comprising the step of: stopping the iteration when all the values in an updated matching matrix becomes close to 0 or close to 1, where a value close to 0 indicates that biological cell $s_j$ in the second image and biological cell $q_i$ in the first image are not matched and a value close to 1 indicates that biological cell $s_j$ in the second image and biological cell $q_i$ in the first image are matched.

20. The method in accordance with claim 1, wherein images in the image sequence are microscopic images.

21. A system for tracking an biological cell in an image sequence, the image sequence including at least, a first image and a second image, taken during development of biological cells in which biological cells are moveable and dividable, the system comprising:
   one or more processors arranged to identify a plurality of biological cells in the first image and a plurality of biological cells in the second image; determine matching probability of an biological cell in the second image with an biological cell in the first image, based on relative positional relationships between the plurality of biological cells in the first image and relative positional relationships between the plurality of biological cells in the second image; and determine, based on the determined matching probability, a matching result indicating whether the biological cell in the second image matches with the biological cell in the first image, wherein a match indicates that the biological cell in the second image corresponds with or originates from the corresponding biological cell in the first image; and
   a display, operably connected with the one or more processors, arranged to display the matching result.

22. The system in accordance with claim 21, wherein the one or more processors are further arranged to repeat the matching probability determination step and the matching determination step for each of the plurality of biological cells in the first image and each of the plurality of biological cells in the second image.

23. The system in accordance with claim 21, further comprising:
   an imaging device, operably connected with the one or more processors, arranged to obtain the first image and the second image.

* * * * *

UNITED STATES PATENT AND TRADEMARK OFFICE
CERTIFICATE OF CORRECTION

PATENT NO. : 10,255,692 B2
APPLICATION NO. : 15/478354
DATED : April 9, 2019
INVENTOR(S) : Logn Chen, Zhongying Zhao and Hong Yan Page 1 of 1

It is certified that error appears in the above-identified patent and that said Letters Patent is hereby corrected as shown below:

On the Title Page

Item (73) should read:
ASSIGNEE: CITY UNIVERSITY OF HONG KONG, Kowloon (HK); HONG KONG BAPTIST UNIVERSITY, Kowloon (HK)

Signed and Sealed this
Fourth Day of June, 2019

Andrei Iancu
*Director of the United States Patent and Trademark Office*